US011636029B2

(12) United States Patent
Deb et al.

(10) Patent No.: US 11,636,029 B2
(45) Date of Patent: *Apr. 25, 2023

(54) TESTING AS A SERVICE

(71) Applicant: CERNER INNOVATION, INC., Kansas City, KS (US)

(72) Inventors: Anindya Deb, Kolkata (IN); Sujoy Acharya, Kolkata (IN); Anand Janakunavar, Kolkata (IN); Sambit Kumar Sahoo, Kolkata (IN); Swaroop Chakraborty, Kolkata (IN); Rahul Kar, Kolkata (IN); Dibyojyoti Senapati, Parganas (N) Kolkata (IN); Saurav Kumar, Kolkata (IN); Arnab Das, Kolkata (IN); Sandipan Ghorai, Kolkata (IN); Amit Das Sarkar, Action Area 1A Kolkata (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,666

(22) Filed: Aug. 18, 2022

(65) Prior Publication Data

US 2022/0391316 A1 Dec. 8, 2022

Related U.S. Application Data

(63) Continuation of application No. 16/705,495, filed on Dec. 6, 2019, now Pat. No. 11,429,514.

(51) Int. Cl.
*G06F 11/36* (2006.01)
*H04L 67/00* (2022.01)
(Continued)

(52) U.S. Cl.
CPC ........... *G06F 11/3688* (2013.01); *G06F 8/65* (2013.01); *G06F 11/3684* (2013.01);
(Continued)

(58) Field of Classification Search
None
See application file for complete search history.

(56) References Cited

U.S. PATENT DOCUMENTS

| 10,289,524 B2 * | 5/2019 | Kaulgud | G06F 11/3612 |
| 2003/0090514 A1 * | 5/2003 | Cole | G06Q 10/10 |
| | | | 715/744 |

(Continued)

OTHER PUBLICATIONS

Mattp123, "Create a business process flow to standardize processes", 2018, Published by Microsoft (Year: 2018).*

(Continued)

*Primary Examiner* — Hossain M Morshed
(74) *Attorney, Agent, or Firm* — Invoke

(57) ABSTRACT

Embodiments of the present disclosure relate to systems, methods, and user interfaces that automate the workflow testing process. Users can configure, automate and execute repeating workflow tests associated with software updates or upgrades. In doing so, issues with the updates or upgrades are proactively prevented. To do so, a selection of one or more business processes is initially received. The one or more business processes are combined into a client workflow. Test data and assertion types are received for each business process of the one or more business processes. A script and metadata containing the client workflow name and the one or more business process names utilized to create the client workflow is stored and the client workflow can be executed in a target environment. Any errors in the client workflow are detected and a notification is provided to a user for follow-up and resolution.

20 Claims, 6 Drawing Sheets

(51) Int. Cl.
*G06F 8/65* (2018.01)
*G06Q 10/06* (2012.01)
*G06Q 10/0633* (2023.01)

(52) U.S. Cl.
CPC ..... *G06F 11/3692* (2013.01); *G06Q 10/0633* (2013.01); *H04L 67/34* (2013.01)

(56) References Cited

U.S. PATENT DOCUMENTS

| | | | | |
|---|---|---|---|---|
| 2006/0036522 | A1* | 2/2006 | Perham | G06Q 40/06 705/35 |
| 2006/0074736 | A1* | 4/2006 | Shukla | G06Q 10/06 717/100 |
| 2007/0240046 | A1* | 10/2007 | Yan | G06Q 10/06 715/700 |
| 2010/0153166 | A1* | 6/2010 | Cholewinski | G06Q 10/0633 715/780 |
| 2011/0282709 | A1* | 11/2011 | Rangaswamy | G06Q 10/0633 705/7.27 |
| 2014/0075413 | A1* | 3/2014 | Binjrajka | G06F 8/71 717/121 |
| 2018/0247243 | A1* | 8/2018 | Moolman | G06Q 10/06313 |
| 2018/0293533 | A1* | 10/2018 | Lowry | G06F 9/543 |
| 2020/0050529 | A1* | 2/2020 | Balasu | G06Q 10/0633 |
| 2020/0183968 | A1* | 6/2020 | Breymann | G11B 27/031 |
| 2021/0067607 | A1* | 3/2021 | Gardner | H04L 41/082 |
| 2021/0173766 | A1 | 6/2021 | Deb et al. | |

OTHER PUBLICATIONS

Chetty, "How to Perform Workflow Testing for BPM Applications", 2014, Published by Evoke Technologies (Year: 2014).*

Chetty, Nateshk., "How to Perform Workflow Testing for BPM Applications", Available online at: <https://www.evoketechnologies.com/blog/perform-workflow-testing-bpm-applications/>, Aug. 12, 2014, 15 pages.

HP, "HP Business Process Testing", Software Version: 12.01, User Guide, Jun. 2014, 260 pages.

Create a Business Process Flow to Standardize Processes, Available online at: <https://docs.microsoft.com/en-us/dynamics365/customerengagement/on-premises/customize/create-business-process-flow>, Nov. 9, 2018, 12 pages.

* cited by examiner

TESTING AS A SERVICE

CROSS REFERENCE TO RELATED APPLICATIONS

This application is a continuation of, and claims priority from, U.S. patent application Ser. No. 16/705,495, filed on Dec. 6, 2019, the contents of which are hereby incorporated herein in their entireties by reference.

BACKGROUND

As companies are moving towards cloud adoption so that the latest and greatest innovations can be adopted quickly, continuous delivery plays a key role. For example, continuous delivery ensures that code can be rapidly and safely deployed to production environments. Many software solutions require frequent updates using mass deployment. However, every new software delivery results in clients having to perform a series of long running workflow tests to make sure the quality of the software is suitable and does not break any workflows. If any issues are discovered during client testing, fixes are applied, and the workflow tests are repeated. Moreover, the testing often requires engaging experts and takes more than a month to complete. For these reasons, many clients are reluctant to apply new releases frequently.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to systems, methods, and user interfaces that automate the workflow testing process. More particularly, embodiments of the present disclosure enables users to configure, automate and execute repeating workflow tests associated with software updates or upgrades. In doing so, issues with the updates or upgrades are proactively detected and resolved to ensure better quality of the updates or upgrades. To do so, a selection of one or more business processes is initially received. The one or more business processes are combined into a client workflow. Test data and assertion types are received for each business process of the one or more business processes. A script and metadata containing the client workflow name and the one or more business process names utilized to create the client workflow is stored and the client workflow can be executed in a target environment. Any errors in the client workflow are detected and a notification is provided to a user for follow-up and resolution.

BRIEF DESCRIPTION OF THE DRAWINGS

The present invention is described in detail below with reference to the attached drawing figures, wherein.

DETAILED DESCRIPTION OF THE INVENTION

Figure 1:
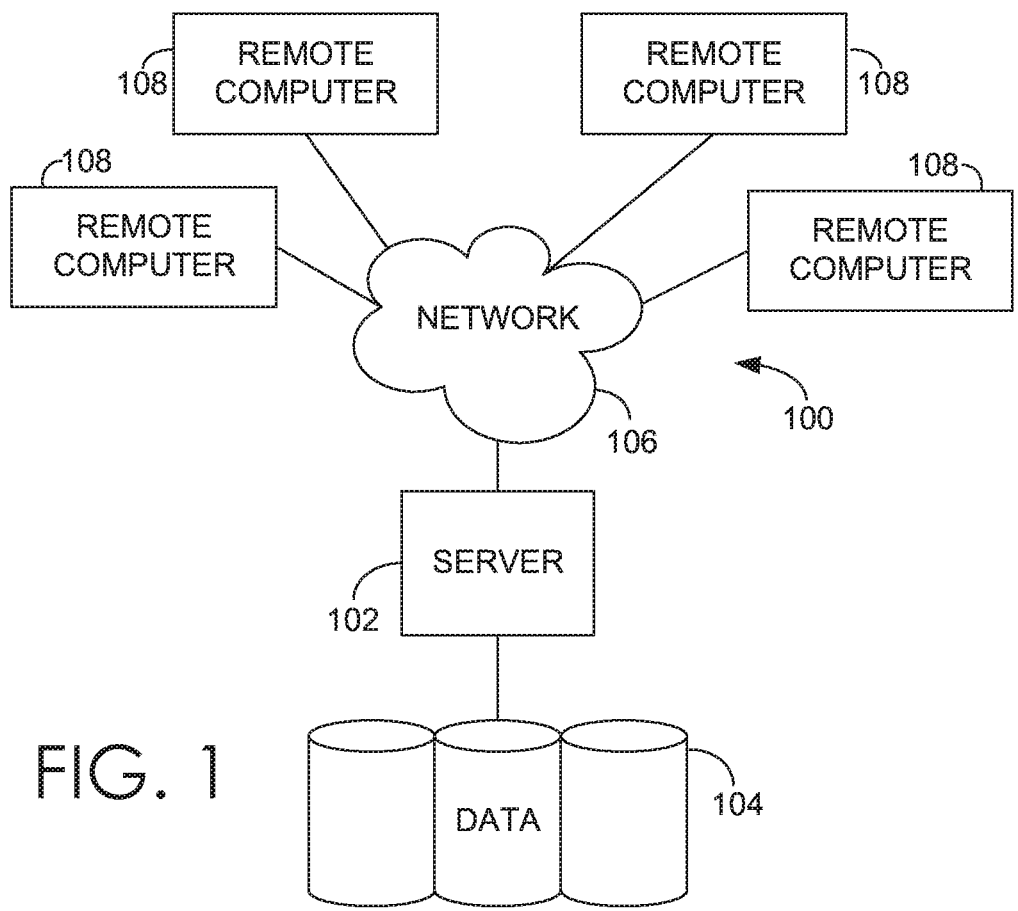
FIG. 1 is a block diagram of an exemplary operating environment suitable to implement embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

As noted in the background, as companies are moving towards cloud adoption so that the latest and greatest innovations can be adopted quickly, continuous delivery plays a key role. For example, continuous delivery ensures that code can be rapidly and safely deployed to production environments. Many software solutions require frequent updates or upgrades using mass deployment. However, every new software delivery results in clients having to perform a series of long running workflow tests to make sure the quality of the software is suitable and does not break any workflows. If any issues are discovered during client testing, fixes are applied, and the workflow tests are repeated. Moreover, the testing often requires engaging experts and takes more than a month to complete. For these reasons, many clients are reluctant to apply new releases frequently.

Embodiments of the present disclosure relate to systems, methods, and user interfaces that automate the workflow testing process. More particularly, embodiments of the present disclosure enables users to configure, automate and execute repeating workflow tests associated with software updates or upgrades. In doing so, issues with the updates or upgrades are proactively detected and resolved to ensure better quality of the updates or upgrades. To do so, a selection of one or more business processes is initially received. The one or more business processes are combined into a client workflow. Test data and assertion types are received for each business process of the one or more business processes. A script and metadata containing the client workflow name and the one or more business process names utilized to create the client workflow is stored and the client workflow can be executed in a target environment. Any errors in the client workflow are detected and a notification is provided to a user for follow-up and resolution.

The testing-as-a-service platform allows users to configure and automate testing processes, reduce costs (e.g., support costs and user acceptance testing costs), and reduce testing cycle times and go-live delays. Additionally, the testing-as-a-service platform encourages mass deployment of software updates or upgrades to remain current and enables users to exploit the latest innovations. The testing-as-a-service platform also enables various user workflows to be learned and any defects may be discovered early in the development process. Moreover, the various user workflow data can be analyzed and the workflows may be configured more efficiently. Each of these benefits provide confidence to users that may otherwise forego software updates or upgrades, and in doing so, generally expedites the cloud adoption process.

The testing-as-a-service platform comprises several components, which will be discussed in more detail below. A user interface enables a user to stitch together business processes and build a workflow. Data is captured a single time by executed the built workflow that is later used as test data when one or more of the business processes are updated or upgraded. Automated execution of the workflows can be scheduled or performed on-demand, such as when testing a software update or upgrade. Additionally, client context customizations, such as adaptability settings, are enabled.

Accordingly, one embodiment of the present disclosure is directed to one or more computer storage media having computer-executable instructions embodied thereon that, when executed by a computer, causes the computer to perform operations. The operations include receiving a selection of one or more business processes. The one or more business processes are combined into a client workflow. The operations also include receiving test data and assertion types for each business process of the one or more business processes. The operations further include storing a script and metadata containing the client workflow name and the one or more business process names utilized to create the client workflow. The operations also include executing the client workflow in a target environment. The operations further include detecting errors in the client workflow and provide a notification to a user for follow-up and resolution.

In another embodiment, the present disclosure is directed to a computerized method. The method comprises receiving a selection of one or more business processes. The one or more business processes are combined into a client workflow. The method also comprises receiving test data and assertion types for each business process of the one or more business processes. The method further comprises storing a script and metadata containing the client workflow name and the one or more business process names utilized to create the client workflow. The method also comprises executing the client workflow in a target environment. The method further comprises detecting errors in the client workflow and providing a notification to a user for follow-up and resolution.

In yet another embodiment, the present disclosure is directed to a system. The system comprises a processor; and a computer storage medium storing computer-usable instructions that, when used by the processor, cause the processor to: receive a selection of one or more business processes, the one or more business processes being combined into a client workflow, wherein the selection of one or more business processes is received by intercepting user interaction with the one or more business processes, determining a sequence of execution, and identifying document object model events; receive test data and assertion types for each business process of the one or more business processes; store a script and metadata containing the client workflow name and the one or more business process names utilized to create the client workflow, wherein the script and metadata containing the client workflow name and the one or more business process names utilized to create the client workflow are stored in JavaScript Object Notation (JSON) format in a client environment for workflow code generation; execute the client workflow in a target environment to verify a stability and reliability of a software change or update; and detect errors in the client workflow and provide a notification to a user for follow-up and resolution.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, data cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and providers' offices. Providers may comprise a treating physician or physicians;

specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like.

The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
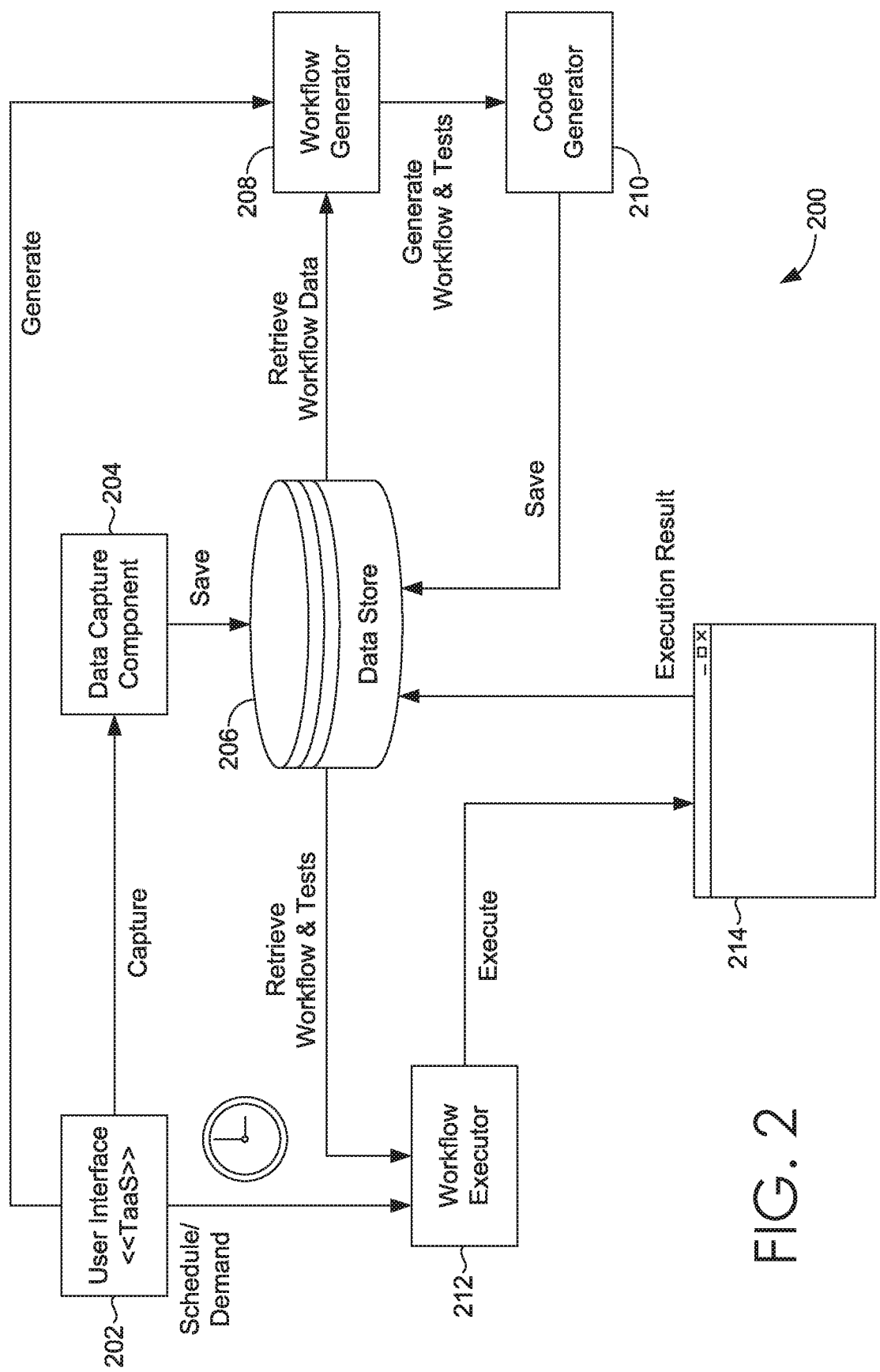
FIG. 2 depicts an exemplary framework of a testing-as-a-service system suitable to implement embodiments of the present invention.

Turning now to FIG. 2, an exemplary framework of a testing-as-a-service system 200 is shown, in accordance with an aspect of the present invention. The testing-as-a-service system 200 is merely an example of one suitable computing system environment and is not intended to suggest any limitation as to the scope of use or functionality of embodiments of the present invention. Neither should the testing-as-a-service system 200 be interpreted as having any dependency or requirement related to any single module/component or combination of modules/components illustrated therein.

The testing-as-a-service system 200 generally operates to automate the workflow testing process. More particularly, the testing-as-a-service system 200 enables users to config-ure, automate and execute repeating workflow tests associated with software updates or upgrades. This encourages mass deployment of software updates or upgrades to remain current and enables users to exploit the latest innovations.

As shown in FIG. 2, the testing-as-a-service system 200 includes, among other components not shown, user interface component 202, data capture component 204, data store 206, workflow generator component 208, code generator component 210, and workflow executor component 212, all in communication with one another via a network (not shown). The network may include, without limitation, one or more local area networks (LANs) and/or wide area networks (WANs). Such networking environments are commonplace in offices, enterprise-wide computer networks, intranets, and the Internet.

In some embodiments, one or more of the illustrated components/modules may be implemented as stand-alone applications. In other embodiments, one or more of the illustrated components/modules may be distributed across multiple testing-as-a-service systems. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the data capture component 204, the workflow generator component 208, the code generator component 210, or the workflow executor component 212 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Each of the data capture component 204, the workflow generator component 208, the code generator component 210, or the workflow executor component 212 may include a processing unit, internal system memory, and a suitable system bus for coupling various system components, including data store 206 for storing information (e.g., workflow data, test data, and execution results). Components of the testing-as-a-service system 200 typically include, or have access to, a variety of computer-readable media.

The testing-as-a-service system 200 is merely exemplary. While components of the testing-as-a-service system 200 are illustrated as a single unit, it will be appreciated that components of the testing-as-a-service system 200 are scalable. For example, each of the data capture component 204, the workflow generator component 208, the code generator component 210, or the workflow executor component 212 may in actuality include a plurality of computing devices in communication with one another. The single unit depictions are meant for clarity, not to limit the scope of embodiments in any form.

As shown in FIG. 2, the testing-as-a-service system 200 includes user interface component 202, data capture component 204, data store 206, workflow generator component 208, code generator component 210, and workflow executor component 212.

The user interface component 202 generally provides an interface that enables a client user to create workflows via the workflow generator component 208, provide test data that may be captured by data capture component 204 and stored in data store 206, and execute the workflows via the workflow executor 212. The user interface component 202 may be configured with pre-populated business processes that enable the user to select various business process as part of a workflow.

In some embodiments, there are three types of processes: navigational/user interface driven processes (e.g., data entry forms), backend processes that are not triggered from a user interface (e.g., webservice calls such as payer post remittances or inbound HL7 transactions), or assertion processes that may validate user assumptions with real system behavior (e.g., to verify receivable amounts after charge postings, to check follow-up history or amounts reimbursed).

The user interface component 202 enables a user to select multiple business processes, as desired, that can be stitched together by the workflow generator component 208 to build a complex business workflow. Each user interface business process may also be associated with a system process. For example, a process that admits a patient may launch a patient admission financial user interface.

The user interface component 202 also enables a user to specify test data that is used by the workflow generator 208 when generating the workflow and tests. As a user interacts with the user interface component 202 for a particular business process, the data capture component 204 intercepts the interaction with the user interface, the sequence of execution, and DOM (Document Object Model) events. Once the process data is captured, the data capture component 204 saves the data in JSON format and retrieves additional metadata and process information. In embodiments, the metadata comprises information corresponding to business process specific attributes including, but not limited to, a patient medical record number, a diagnosis code, or encounter identifier. The process information may include details of dynamically generated web pages. This data is stored in data store 206 and may be used by the workflow generator component 208 during workflow generation and the workflow executor component 212 during testing.

The workflow generator component 208 retrieves the workflow data from data store 206 and stitches the business processes together using connectors. For clarity, a connector is the trigger that executes the next process in the chain of business processes. A connector may comprises consists a timer or a conditional trigger (e.g., execute the next process after four hours or wait until a day-end job is finished).

Upon the workflow generator component 208 stitching together the business processes to create the workflow, the code generator component 210 creates the actual code that is necessary to execute the test. The code generator component 210 communicates the code (e.g., Selenium code) to the data store 206 where it is saved until requested for execution by the workflow executor component 212. The code generation process generates a readily executable code by mapping the captured data with corresponding web page DOM controls based on a predefined code template.

The workflow execution component 212 generally executes workflows as scheduled or on-demand as part of the software update or upgrade process. To do so, the workflow executor component 212 retrieves the workflow and test data from data store 206. The workflow may then be executed. In some embodiments, a client process may span across many days (e.g., ten days). Accordingly, the workflow executor component 212 executes the tests and backend processes as scheduled by the client.

Execution results 214 may be provided to the user via a user interface such as one provided by the user interface component 202. Execution results 214 may also be stored in data store 206 and utilized for troubleshooting and the like. As noted, once the workflow is generated, it can be run repeatedly per a schedule or on-demand. Thus, after each new software deployment, the workflows can be triggered to verify the stability and reliability of the software.

Figure 3:
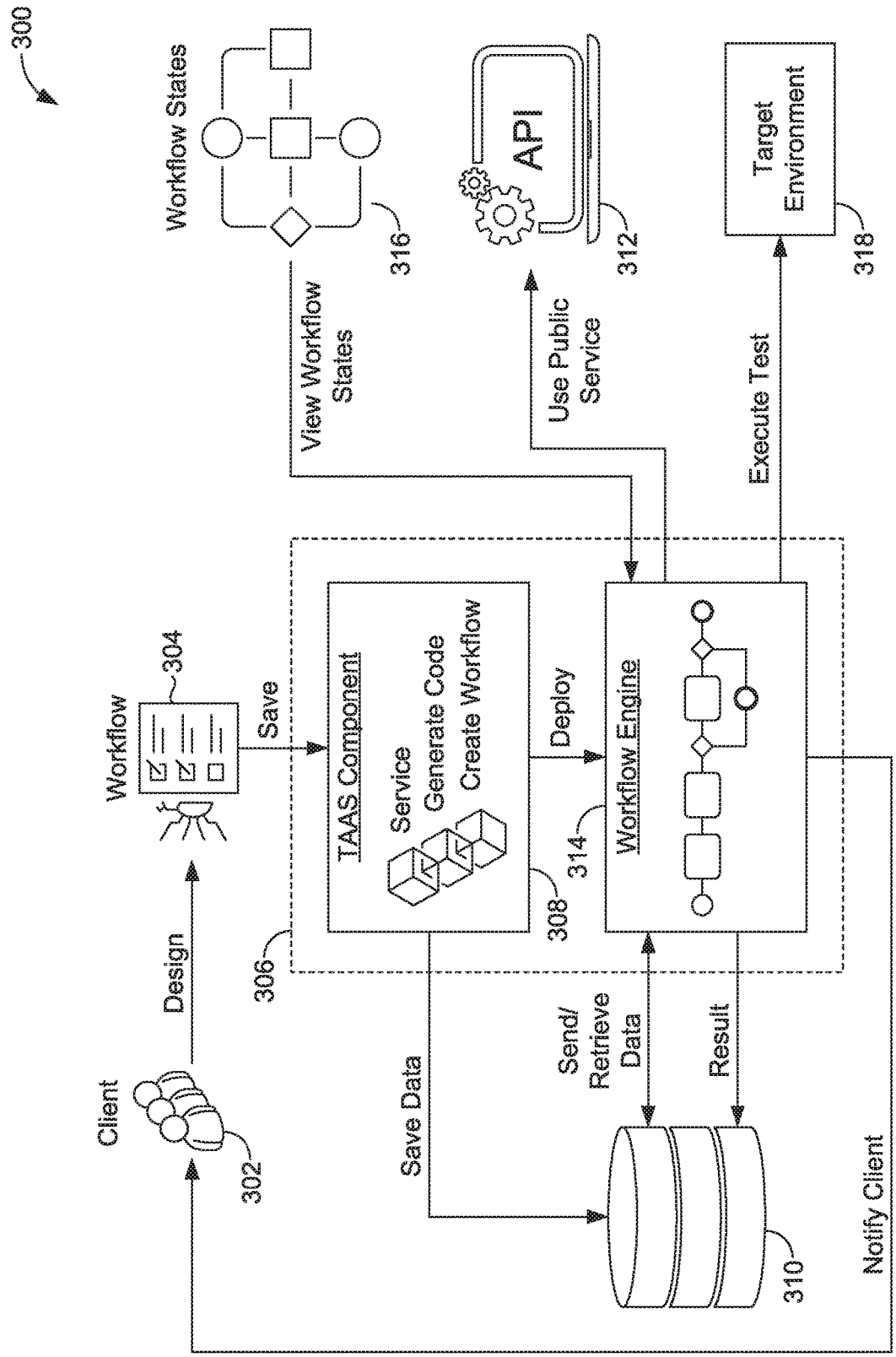
FIG. 3 depicts an exemplary framework of a testing-as-a-service system suitable to implement embodiments of the present invention.

In practice, and referring now to FIG. 3, an exemplary workflow of utilizing a testing-as-a-service system (such as the testing-as-a-service system 200 of FIG. 2) is shown, in accordance with an aspect of the present invention.

As shown in FIG. 2, a user client 302 may design a workflow 304 utilizing the testing-as-a-service system 306. More particularly, the user client 302 initially selects business processes that complete the workflow 304. The workflow may be saved by the testing-as-a-service system 306. The testing-a-service system 306 comprises various components 308 including a user interface component, a workflow generator component, and a code generator (such as the user interface component 202, the workflow generator component 208, and the code generator component 210 of FIG. 2).

Once the components 308 of the testing-as-a-service system 306 generate the workflow and code as described above, that information is saved into database 310. Upon a software update or upgrade being applied to a target environment 318 (e.g., test or non-production environment), a user may desire to execute a test and can access the testing-as-a-service system 306 via an application programming interface (API) 312. Accordingly, the workflow engine 314 of the testing-as-a-service system retrieves data, including test data and the workflow from database 310 and executes the test on the target environment 318. As the test is executed, the user may also view workflow states 316 to see in real-time any errors or unexpected results that may occur. After the test is complete, the workflow engine 314 notifies the client 302 of any errors or unexpected results.

Figure 4:
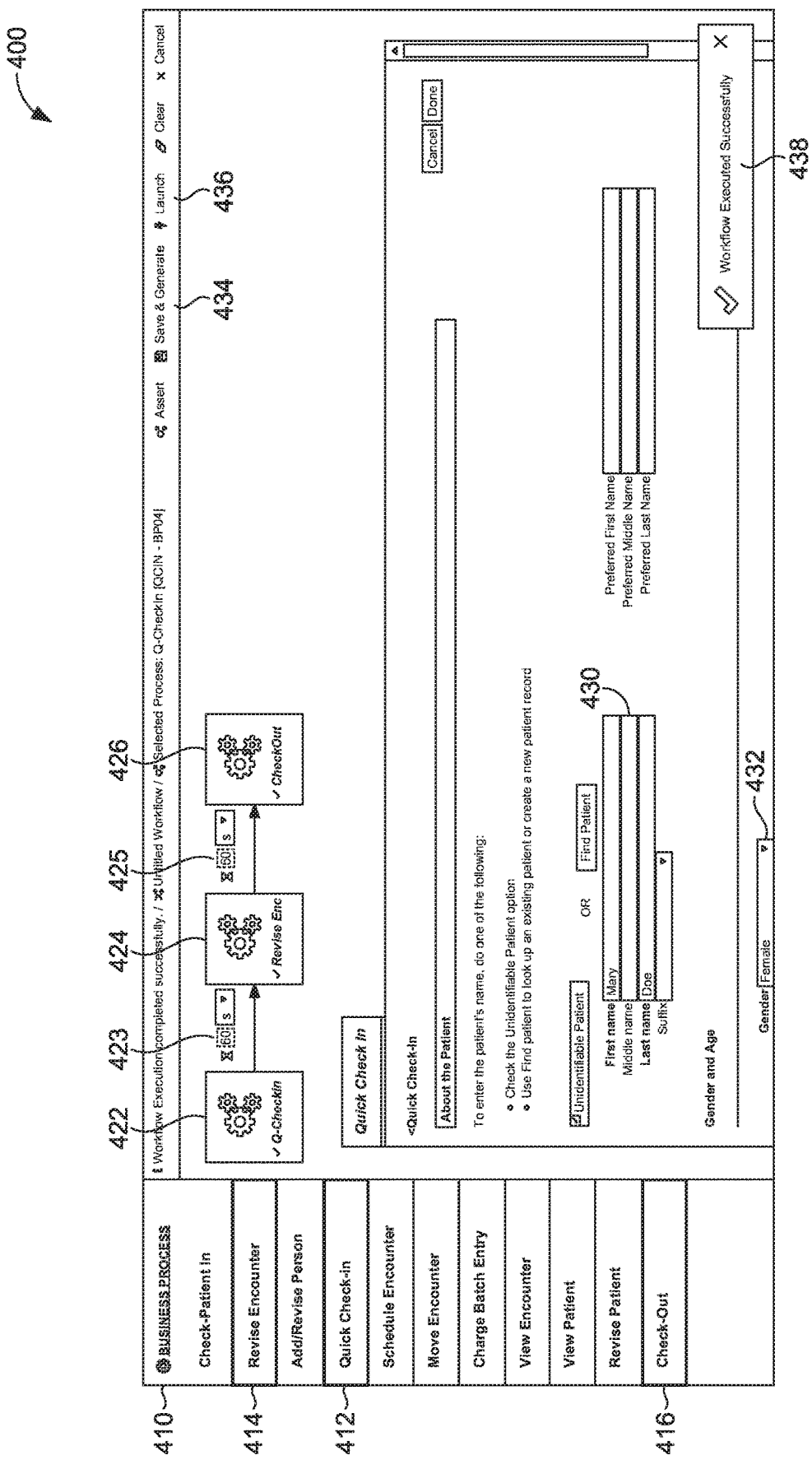
FIG. 4 depicts an illustrative screen display of a testing-as-a-service system suitable to implement embodiments of the present invention.

Referring to FIG. 4, an illustrative screen display 400 of testing-as-a-service system suitable to implement embodiments of the present invention are shown. More particularly, display 400 illustrates a specific example of workflow automation for an emergency room visit workflow involving three business process: check-in (admit a patient), revise an encounter (modify patient/visit information), and checkout (discharge the patient).

As shown in display 400, the client users will have the option to pick and choose relevant business processes from the provided list (i.e., the left pane) 410 to define a workflow. As shown, the user has selected Quick Check-in 412, Revise Encounter 414, and Check-out 416. Each selected business process 422, 424, 426 launches the corresponding user interface where the user inputs any necessary data and proceeds through each business process until the workflow steps are completed. As shown, the Quick-Check-in 422 user interface has launched and the user may input data in the illustrated data fields 430, 432. Additionally, the user may input configuration details 423, 425, as desired. Such details include a length of time for each business process test to execute. Once the user clicks on Save & Generate 434, the workflow is saved and can be scheduled or utilized as-needed. Upon selecting Launch 436, the auto-generated workflows are executed in sequence to test the workflow and provide assertion to validate the expected results. If the workflow executes successfully, the user is prompted 438, and the software update or upgrade may be safely delivered to the client's production environment.

Figure 5:
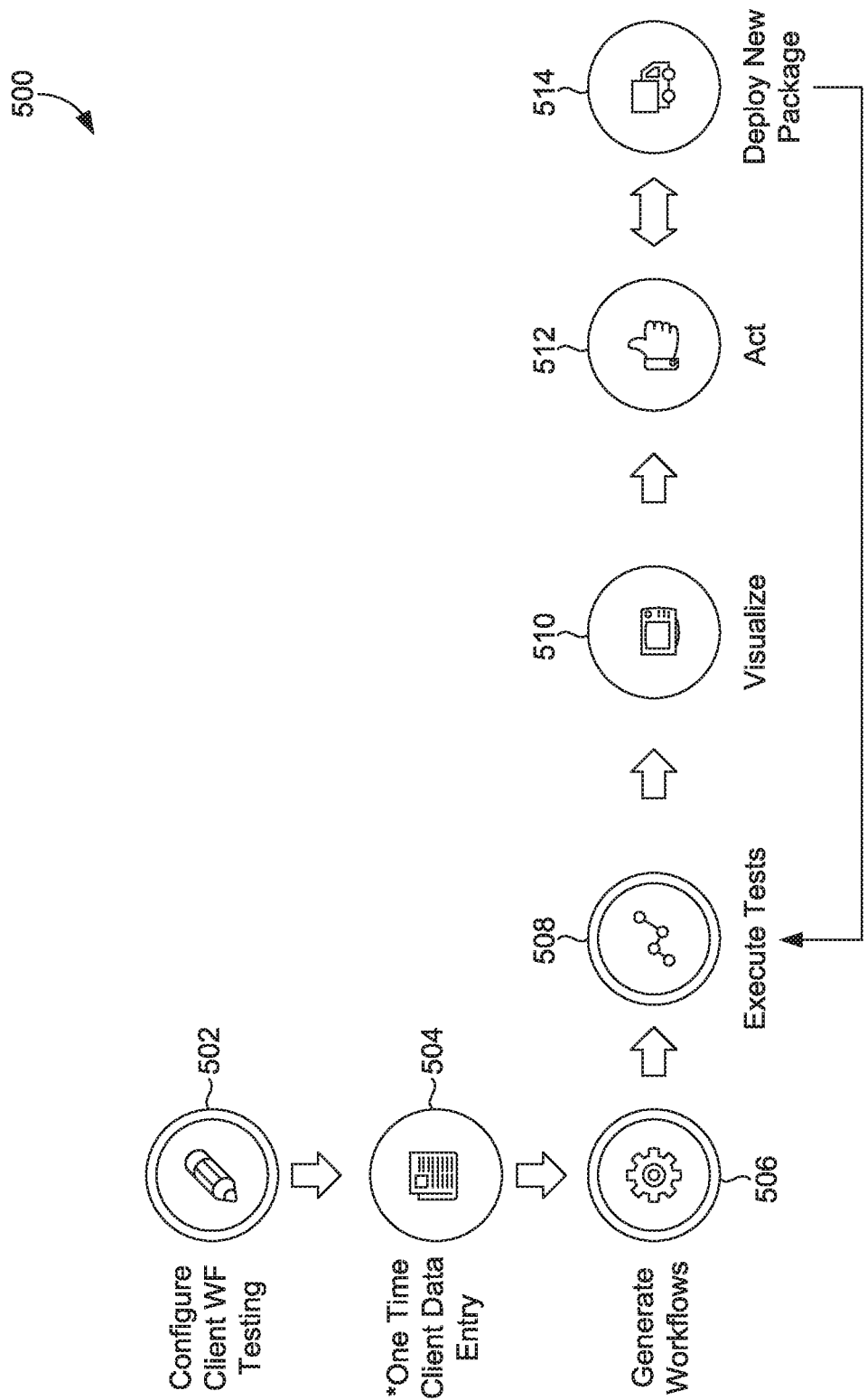
FIG. 5 depicts a flow diagram illustrating a method for utilizing a testing-as-a-service system to deploy a new software package, in accordance with an embodiment of the present invention.

In FIG. 5, a flow diagram is provided illustrating a method 500 for utilizing a testing-as-a-service system to deploy a new software package, in accordance with an embodiment of the present invention. Method 500 may be performed by any computing device (such as computing device described with respect to FIG. 1) with access to testing-as-a-service system (such as the one described with respect to FIG. 2 or 3) or by one or more components of the testing-as-a-service system.

Initially, at step 502, a user configures the workflow to be tested as described above. Additionally, the user provides one time data entry for the workflow, as shown at step 504.

At step 506, once the workflow is created by stitching multiple business processes selected by the user, along with adding test data against the business process, the workflow is saved. The workflow comprises a script and metadata containing the workflow name and the business process names used in creating that workflow.

At step 508, once the workflow is configured and saved in a data store, the saved workflow can be executed repeatedly (i.e., scheduled) or as required in the target environment (e.g. a test or beta environment) before deploying the software package in a production environment.

At step 510, the testing-as-a-service platform provides a visualized within the internal quality assurance environment and augments the automation of vertical regression tests. This helps a user better understand the software update or upgrade in terms of business workflow and data setup, resulting in early detection and resolution of issues.

At step 512, early detection of issues at the software level enables a relevant notification to be provided. This notification helps support act proactively and take necessary actions to avoid go-live delays.

At step 514, a new package (e.g., a software update or upgrade) is deployed. As shown, each time a new package is deployed, the tests are executed again at step 508, and the process repeats. This enables new software packages to be continuously deployed as automated test services will detect errors and notify users as for follow-up and resolution.

Figure 6:
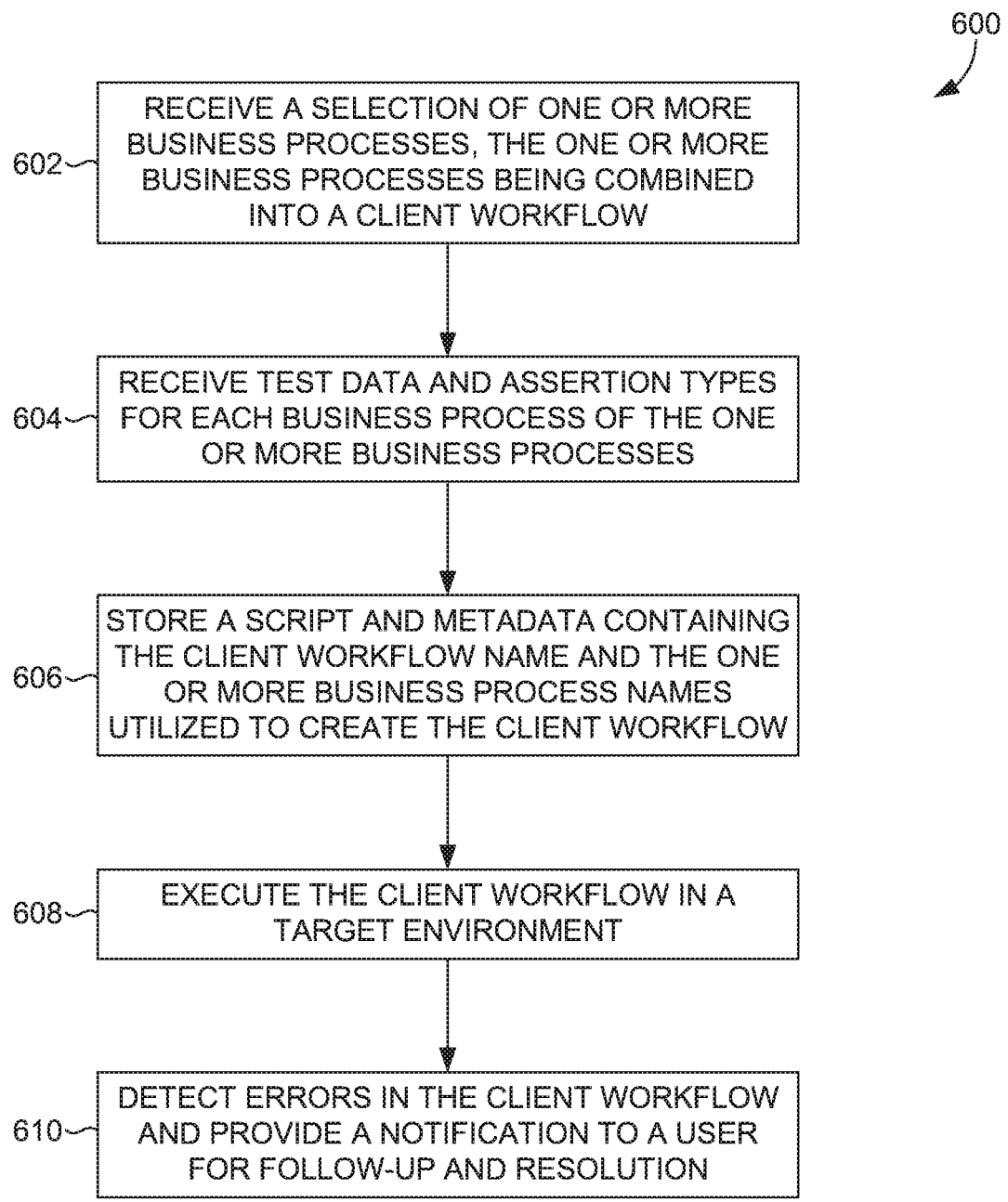
FIG. 6 depicts a flow diagram illustrating a method for creating and executing a client workflow in a test environment to detect errors in the client workflow, in accordance with an embodiment of the present invention.

Referring now to FIG. 6, a flow diagram is provided illustrating a method 600 for creating and executing a client workflow in a test environment to detect errors in the client workflow, in accordance with embodiments of the present invention. Method 600 may be performed by any computing device (such as computing device described with respect to FIG. 1) with access to a testing-as-a-service system (such as the one described with respect to FIG. 2) or by one or more components of the testing-as-a-service system.

Initially, at step 602, a selection of one or more business processes is received. The one or more business processes may correspond to software in a health care information technology environment and are combined into a client workflow. For example, the one or business processes may comprise an admission process, an encounter process, and a discharge process.

In some embodiments, the selection of one or more business processes is received by intercepting user interaction with the one or more business processes, determining a sequence of execution, and identifying document object model events. Each business process of the one or more business processes is connected through connectors, with each connector being a trigger to the next business process in the client workflow. In some embodiments, each business process of the one or more business processes is associated with a system process that launches a separate user interface.

The user may be prompted to interact with a user interface for each business process of the one or more business processes. Accordingly, at step 604, test data and assertion types for each business process of the one or more business processes is received. For example, the test data may comprise various data entries that a user may make in the normal course of using each of the one or more business processes. In the context of health care information technology software, those data entries may include a patient name, gender, date of birth, guarantor balance, encounter start and end time, discharge destination, insurance information, and the like. The assertion types may be workflow level (e.g., corresponding to an emergency department visit), business process level (e.g., corresponding to a patient registration, a patient discharge, etc.), or field level (e.g., corresponding to a diagnosis code, attending health professional, generated claim amount, etc).

At step 606, a script and metadata containing the client workflow name and the one or more business process names utilized to create the client workflow are stored. The script and metadata containing the client workflow name and the one or more business process names that is utilized to create the client workflow may be stored in a JSON format in a client environment for workflow code generation.

The stored script and metadata can be used, at step 608, to execute the client workflow in a target environment. The user may be prompted to validate expected results. At step 610, errors are detected in the client workflow and a notification is provided to a user for follow-up and resolution. In this way, the client workflow may verify the stability and reliability of a software change or update.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. One or more computer storage media having computer-executable instructions embodied thereon that, when executed by a computer, causes the computer to perform operations, the operations comprising:
   receiving a selection of one or more business processes;
   enabling a user to specify data that is used when generating and testing a client workflow corresponding to the one or more business processes by:
   (1) intercepting data comprising a user interaction with a user interface, a sequence of execution, and Document Object Model (DOM) events for the one or more business processes; and
   (2) saving the data in JSON format in a data store and retrieving additional metadata and process information corresponding to business process specific attributes including a patient medical record number, a diagnosis code, or encounter identifier; and generating executable code for the client workflow by mapping retrieved data with corresponding web page DOM controls based on a predefined code template.

2. The media of claim 1, further comprising retrieving the data from the data store and stitching the one or more business processes together using connectors, the connectors being a trigger that executes the next business process in the chain of the one or more business processes.

3. The media of claim 1, further comprising executing the client workflow in a target environment.

4. The media of claim 3, further comprising detecting errors in the client workflow and provide a notification to a user for follow-up and resolution.

5. The media of claim 1, further comprising prompting the user to interact with a user interface for each business process of the one or more business processes.

6. The media of claim 1, further comprising prompting the user to validate expected results.

7. The media of claim 1, wherein the selection of one or more business processes is received by:
   intercepting user interaction with the one or more business processes;
   determining a sequence of execution; and
   identifying document object model events.

8. A computerized method comprising:
   receiving a selection of one or more business processes comprising an admission process, an encounter process, or a discharge process;
   enabling a user to specify data that is used when generating and testing a client workflow corresponding to the one or more business processes by:
   (1) intercepting data comprising a user interaction with a user interface, a sequence of execution, and Document Object Model (DOM) events for the one or more business processes; and
   (2) saving the data in JSON format in a data store and retrieving additional metadata and process information corresponding to business process specific attributes including a patient medical record number, a diagnosis code, or encounter identifier, wherein the workflow verifies a stability and reliability of a software change or update; and
   generating executable code for the client workflow by mapping retrieved data with corresponding web page DOM controls based on a predefined code template.

9. The method of claim 8, further comprising retrieving the data from the data store and stitching the one or more business processes together using connectors, the connectors being a trigger that executes the next business process in the chain of the one or more business processes.

10. The method of claim 8, further comprising executing the client workflow in a target environment.

11. The method of claim 10, further comprising detecting errors in the client workflow and provide a notification to a user for follow-up and resolution.

12. The method of claim 8, further comprising prompting the user to interact with a user interface for each business process of the one or more business processes.

13. The method of claim 8, further comprising prompting the user to validate expected results.

14. The method of claim 8, wherein the selection of one or more business processes is received by:
   intercepting user interaction with the one or more business processes;
   determining a sequence of execution; and
   identifying document object model events.

15. A system comprising:
   a processor; and
   a computer storage medium storing computer-usable instructions that, when used by the processor, cause the processor to:
   receive a selection of one or more business processes;
   enable a user to specify data that is used when generating and testing a client workflow corresponding to the one or more business processes by:
   intercepting data comprising a user interaction with a user interface, a sequence of execution, and Document Object Model (DOM) events for the one or more business processes; and
   saving the data in JSON format in a data store and retrieving additional metadata and process information corresponding to business process specific attributes including a patient medical record number, a diagnosis code, or encounter identifier; and
   generate executable code for the client workflow by mapping retrieved data with corresponding web page DOM controls based on a predefined code template.

16. The system of claim 15, further comprising retrieving the data from the data store and stitching the one or more business processes together using connectors, the connectors being a trigger that executes the next business process in the chain of the one or more business processes.

17. The system of claim 15, further comprising executing the client workflow in a target environment.

18. The system of claim 17, further comprising detecting errors in the client workflow and provide a notification to a user for follow-up and resolution.

19. The system of claim 15, further comprising:
   prompting the user to interact with a user interface for each business process of the one or more business processes; and
   prompting the user to validate expected results.

20. The system of claim 15, wherein the selection of one or more business processes is received by:
   intercepting user interaction with the one or more business processes;
   determining a sequence of execution; and
   identifying document object model events.

* * * * *